April 19, 1955     F. B. SCHNEIDER     2,706,453
RAIL VEHICLE
Filed July 16, 1952
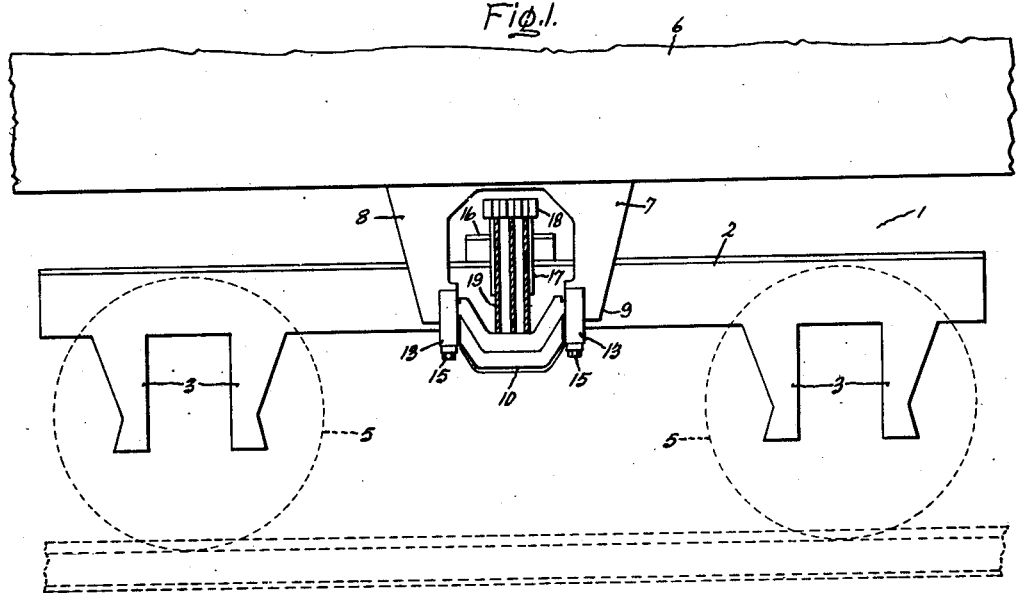
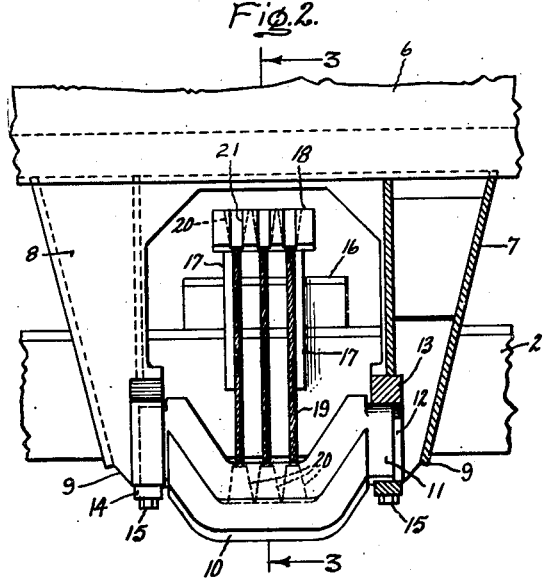
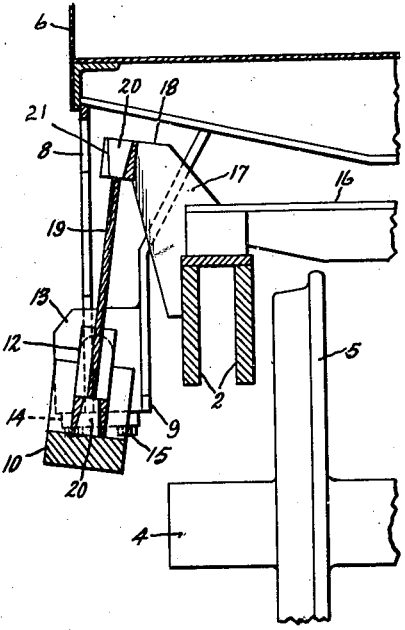
Inventor:
Fred B. Schneider,
by
His Attorney.

United States Patent Office 2,706,453
Patented Apr. 19, 1955

2,706,453

RAIL VEHICLE

Fred B. Schneider, Wesleyville, Pa., assignor to General Electric Company, a corporation of New York Application July 16, 1952, Serial No. 299,075

10 Claims. (Cl. 105—199)

This invention relates to rail vehicles and more particularly to means for supporting the body of a rail vehicle on the trucks.

In the construction of rail vehicles, specifically diesel electric and electric locomotives, it has been the conventional practice to support the body or cab of the locomotive on a center plate formed on the truck frame. This arrangement not only supports the cab, but also permits the truck to pivot with respect to the cab thereby to enable the locomotive to negotiate curves without impact shocks. The provision of a center plate on a transverse member or bolster arranged between the side frames of the truck limits the access to the traction motors mounted on the axles, especially in the case of a three axle truck having a traction motor mounted on each axle. Furthermore, since the cab has large and heavy equipment mounted therein, such as diesel engines and generators, the resultant weight of the cab necessitates a large center plate and thus expensive machining and a complicated lubrication system. In addition, it may be desirable to provide for limited transverse motion of the truck with respect to the cab so that the truck may follow irregularities in the track without imparting side motion to the cab. In conventional truck construction, this transverse motion is provided for by mounting the center plate on a separate swing bolster which in turn is suspended from the truck frame by hangers, thus permitting limited sidewise movements.

It is therefore desirable to provide an arrangement for supporting the body or cab of the vehicle on the trucks which eliminates the center plate and yet permits at least limited pivotal and transverse motion of the truck with respect to the cab. In some recent locomotive designs, four hangers located at the sides of the cab and trucks directly opposite the former center plates serve to support the cab. These hangers must not only support the weight of the cab, but must also provide sufficient flexibility to permit lateral and longitudinal deflections of the trucks with respect to the cab. This freedom of movement has been achieved by providing sliding surfaces. However, since the pressure per unit of area of these sliding surfaces must be low, the dimensions and weight of the complete hanger assemblies with supports and sliding surfaces has been required to be quite large. It is therefore further desirable to provide a cab supporting construction eliminating the center plates and further eliminating all sliding surfaces.

An object of this invention is therefore to provide a rail vehicle construction wherein the body is supported on the truck without a center plate and without the use of any sliding surfaces.

Further objects and advantages of this invention will become apparent and the invention will be better understood by reference to the following description and the accompanying drawing, and the features of novelty which characterize this invention will be pointed out with particularity in the claims annexed to and forming a part of the specification.

In accordance with the broadest aspects of this invention, a rail vehicle body is supported on a truck by means of a flexible cable having one end connected to the truck frame and its other end connected to the body with the point of connection of the cable to the body being below the point of connection to the truck frame so that the cable forms a hanger for supporting the body, the flexibility of the cable permitting limited pivotal and transverse motion of the truck with respect to the body. More specifically, a downwardly extending projection is formed on each side of the body and an outwardly extending projection is formed on each side of the truck with its outer extremity being above the lower extremity of the corresponding body projection and with the flexible cables respectively connecting these projections forming hangers.

In the drawing,
Fig. 1 is a side elevational view illustrating an improved body supporting arrangement of this invention;
Fig. 2 is a fragmentary side elevational view, partly in section, further illustrating the improved construction of Fig. 1; and
Fig. 3 is a fragmentary view taken along the line 3—3 of Fig. 2.

Referring now to the drawing, there is shown a truck 1 having an integral frame member, a portion of which is shown in the drawings as side frames 2 on which downwardly depending pedestals 3 are formed for guiding the usual journal boxes (not shown) for axles 4 on which wheels 5 are mounted. A body 6 is arranged over the truck 1 and in order to support the body 6 on the truck 1 and to permit limited pivotal and transverse motion of the truck with respect to the body, the arrangement now to be described is provided.

A pair of downwardly extending projections or legs 7 and 8 are formed on each side of the body 6 with their lower extremities 9 being arranged on the outside of and extending past the side frames 2 of truck 1. A gib member 10 is positioned between each pair of legs 7 and 8 with its end portions 11 being positioned in slots 12 formed in plate members 13 respectively secured to the legs 7 and 8. Inspection of Fig. 3 will readily show that the slots 12 are formed at a slight angle so that the gib 10 faces inwardly, as will be hereinafter more fully described. While not essential, the slots 12 may be closed by suitable plates 14 secured to the plate members 13 by suitable studs 15.

A bolster or transverse member 16 interconnects the upper surfaces of the side frames 2 of truck frame 1 and an outwardly extending hook member 17 is secured thereto on each side of the truck with its outer extremity 18 being arranged between the downwardly extending legs 7 and 8. A plurality of flexible steel cables 19 are provided each having one end secured to the gib 10 and its other end secured to the extremity 18 of hook 17. The ends of cables 19 which are connected to hook 17 are fastened in tapered plugs 20 which in turn are inserted in corresponding sockets in the hook 17. Slots 21, wide enough to pass cables 19, communicate with the tapered sockets and thus, when it is desired to remove the body 6 from the truck 1, plugs 20 need merely to be knocked out of the sockets in the extremity 18 of hook 17 and the cable 19 removed through slots 21.

It will be readily seen that the cables 19 serve as hangers with the hook 17 on truck 1 supporting body 6 through the cables 19, gib 10, and legs 7 and 8, thus completely eliminating the conventional center plate and without relying on any sliding or frictional bearing surfaces. The flexibility of the cables 19 permits the truck to both pivot and move transversely with respect to the body 6 and since no bearing surfaces are necessary, the requirement for lubrication is completely eliminated. While two downwardly projecting legs have been shown on the body and one hook on the truck, it will be readily apparent that this arrangement can be reversed with one leg extending downwardly from the body and two hooks with a connecting gib being provided on the truck. Furthermore, while three cables 19 have been shown, it will be readily understood that a single cable of greater diameter may be used, or a larger number than three provided. It will be readily seen that the point of connection of the cables 19 with gib 10 is spaced outwardly from the point of connection of the cables with hook 17. Thus, cables 19 are inclined downwardly away from truck 1 in order to dampen transverse swinging of the cab 6 with respect to the truck 1. Gib 10 is inclined inwardly and extension 18 of hook 17 is inclined outwardly to accommodate the inclination of cables 19.

While I have shown and described a particular embodiment of this invention, further modifications and improvements will occur to those skilled in the art. I desire it to be understood, therefore, that this invention is not limited to the form shown, and I intend in the appended claims to cover all modifications which do not depart from the spirit and scope of this invention.

What I claim as new and desire to secure by Letters Patent of the United States is:

1. In a rail vehicle, a truck, a body positioned over said truck, and means for supporting said body on said truck allowing both limited pivotal and transverse motion of said truck relative to said body comprising a flexible cable having one end connected to said truck and its other end connected to said body, the point of connection of said cable to said body being below said body and below the point of connection to said truck so that said cable forms a hanger for supporting said body.

2. In a rail vehicle, a truck, a body positioned over said truck, and means for supporting said body on said truck comprising a pair of flexible cables respectively arranged on the sides of said truck each having one end connected to said truck and its other end connected to said body, the points of connection of said cables with said body being below the points of connection with said truck so that said cables form hangers for supporting said body, said cables being flexible to allow limited pivotal and transverse motion of said truck with respect to said body.

3. In a rail vehicle, a truck, a body positioned over said truck, and means for supporting said body on said truck comprising a downwardly projecting member formed on said body having its lower extremity extending past a portion of said truck, and a flexible cable having one end connected to said projecting member extremity and its other end connected to said truck portion forming a hanger to support said body, said cable being flexible to allow limited pivotal and transverse motion of said truck with respect to said body.

4. In a rail vehicle, a truck, a body positioned over said truck, and means for supporting said body on said truck comprising a pair of downwardly projecting members respectively formed on the sides of said body and having their lower extremities extending past portions of said truck, and a pair of flexible cables each having one end connected to one of said projecting member extremities and its other end connected to one of said truck portions forming hangers to support said body, said cables being flexible to allow limited pivotal and transverse motion of said truck with respect to said body.

5. In a rail vehicle, a truck, a body positioned over said truck, and means for supporting said body on said truck comprising a pair of downwardly projecting members respectively formed on the sides of said body having their lower extremities respectively arranged on the outside and below portions of said truck, and a pair of flexible cables each having one end connected to one of said projecting member extremities and its other end connected to said truck forming hangers to support said body, said cables being flexible to allow limited pivotal and transverse motion of said truck with respect to said body.

6. In a rail vehicle, a truck having an integral frame, a body positioned over said truck, and means for supporting said body on said truck comprising a pair of outwardly extending projections respectively formed on the sides of said truck frame, a pair of downwardly projecting members respectively formed on the sides of said body with their lower extremities being respectively arranged on the outside of said truck frame and below said truck frame projections, and a pair of flexible cables each having one end connected to one of said projecting member extremities and its other end connected to one of said truck frame projections forming hangers to support said body from said truck, said cables being flexible to allow limited pivotal and transverse motion of said truck with respect to said body.

7. In a rail vehicle, a truck having a frame, a body positioned over said truck, and means for supporting said body on said truck comprising a pair of longitudinally spaced apart downwardly projecting members respectively formed on each side of said body outwardly from said truck frame, a gib member connecting the lower ends of each of said pair of projecting members, a pair of outwardly extending projections respectively formed on the sides of said truck frame and respectively extending between said pairs of downwardly projecting members, and a pair of flexible cables each having one end connected to one of said gib members and its other end connected to one of said truck frame projections forming hangers to support said body from said truck, said cables being flexible to allow limited pivotal and transverse motion of said truck with respect to said body.

8. In a rail vehicle, a truck having a frame, a body positioned over said truck, and means for supporting said body on said truck comprising a pair of outwardly extending projections formed on the sides of said truck frame, a pair of downwardly projecting members respectively formed on the sides of said body with their lower extremities being respectively arranged on the outside of said truck frame and below said truck frame projections, and a pair of flexible cables each having one end connected to one of said projecting member extremities and its other end connected to one of said truck frame projections forming hangers to support said body, said cables being flexible to allow limited pivotal and transverse motion of said truck with respect to said body, the points of connection of said cables with said projecting member extremities being spaced outwardly from the points of connection with said truck frame projections so that said cables are inclined downwardly away from said truck frame to dampen the transverse motion of said truck with respect to said body.

9. In a rail vehicle, a truck having a frame, a body positioned over said truck, and means for supporting said body on said truck comprising a pair of outwardly extending projections respectively formed on the sides of said truck frame each having a downwardly converging opening formed therein, each of said projections having a slot formed therein communicating with said opening, a pair of downwardly projecting members respectively formed on the sides of said body having their lower extremities respectively arranged on the outside of said truck frame and below said truck frame projections, and a pair of flexible cables each having one end connected to one of said projecting member extremities and its other end connected to a tapered plug member, said plug member being positioned in said downwardly converging openings so that said cables form hangers to support said body, said cables being flexible to allow limited pivotal and transverse motion of said truck with respect to said body, said slots being wider than said cables to allow removal of said cables from said projections.

10. In a rail vehicle, a truck having a frame, a body positioned over said truck, and means for supporting said body on said truck comprising a pair of longitudinally spaced apart downwardly projecting members respectively formed on each side of said body outwardly from said truck frame and each having a downwardly extending slot formed in its lower extremity, a gib member connecting the lower ends of each of said pair of projecting members and having its ends arranged in said slots, a pair of outwardly extending projections respectively formed on the sides of said truck frame and respectively extending between said pairs of downwardly projecting members, and a pair of flexible cables each having one end connected to one of said gib members and its other end connected to one of said truck frame projections forming hangers to support said body from said truck frame projections, said cables being flexible to allow limited pivotal and transverse motion of said truck with respect to said body.

References Cited in the file of this patent

UNITED STATES PATENTS

| | | |
|---|---|---|
| 124,734 | Gird | Mar. 19, 1872 |
| 2,074,891 | Dean | Mar. 23, 1937 |
| 2,091,478 | Hirshfield | Aug. 31, 1937 |